(12) United States Patent
Groenendijk et al.

(10) Patent No.: US 7,958,869 B2
(45) Date of Patent: Jun. 14, 2011

(54) INTERNAL COMBUSTION ENGINE WITH MIXED CAMSHAFTS AND METHOD FOR OPERATING AN INTERNAL COMBUSTION ENGINE

(75) Inventors: Axel Groenendijk, Gifhorn (DE); Volker Cornelius, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 147 days.

(21) Appl. No.: 12/402,624

(22) Filed: Mar. 12, 2009

(65) Prior Publication Data

US 2009/0229548 A1 Sep. 17, 2009

Related U.S. Application Data

(63) Continuation of application No. PCT/EP2007/007897, filed on Sep. 11, 2007.

(30) Foreign Application Priority Data

Sep. 13, 2006 (DE) .......................... 10 2006 042 912

(51) Int. Cl.
*F01L 1/34* (2006.01)
(52) U.S. Cl. ..................................... 123/432; 123/90.17
(58) Field of Classification Search ............... 123/90.15, 123/90.17, 432
See application file for complete search history.

(56) References Cited

U.S. PATENT DOCUMENTS

| | | | |
|---|---|---|---|
| 5,682,854 A | 11/1997 | Ozawa | |
| 6,397,813 B1 | 6/2002 | Han et al. | |
| 7,011,056 B2 * | 3/2006 | Melchior | 123/90.16 |
| 7,146,949 B2 | 12/2006 | Mendler | |
| 7,748,354 B2 * | 7/2010 | Petridis | 123/90.15 |
| 2003/0131805 A1 | 7/2003 | Yang | |
| 2003/0226528 A1 | 12/2003 | Yamaoka et al. | |
| 2004/0069256 A1 * | 4/2004 | Melchior | 123/90.12 |
| 2009/0084333 A1 * | 4/2009 | Cleary et al. | 123/90.17 |

FOREIGN PATENT DOCUMENTS

| | | |
|---|---|---|
| DE | 4426557 A1 | 2/1996 |
| DE | 19581571 T1 | 2/1997 |
| DE | 10117541 A1 | 10/2001 |
| DE | 10122775 A1 | 11/2001 |

(Continued)

OTHER PUBLICATIONS

Search Report issued by the German Patent Office for German Patent Application No. DE 10 2006 042 912.5, dated Sep. 13, 2007.

(Continued)

*Primary Examiner* — Erick Solis
(74) *Attorney, Agent, or Firm* — Manfred Beck, P.A.

(57) ABSTRACT

An internal combustion engine which operates in accordance with an auto-ignition principle includes at least one working cylinder, at least two inlet valves per working cylinder and at least one outlet valve per working cylinder. The internal combustion engine has a first camshaft and a second camshaft. The second camshaft actuates at least one of the inlet valves per working cylinder and actuates at least one outlet valve per working cylinder. The internal combustion engine has an adjuster disposed at the second camshaft. The adjuster adjusts valve control times of the inlet and outlet valves actuated by the second camshaft selectively in an early direction and a late direction in relation to valve control times of the first camshaft. A method for operating an internal combustion engine is also provided.

13 Claims, 3 Drawing Sheets

FOREIGN PATENT DOCUMENTS

| | | |
|---|---|---|
| DE | 10359058 A1 | 7/2005 |
| DE | 60119993 T2 | 1/2007 |
| DE | 60033563 T2 | 8/2007 |
| EP | 0999357 A2 | 5/2000 |
| EP | 1754872 A1 | 2/2007 |
| WO | 0142627 A1 | 6/2001 |
| WO | 0229214 A1 | 4/2002 |

OTHER PUBLICATIONS

International Search Report (Form PCT/ISA/210) for International Application PCT/EP2007/007897, dated Jan. 15, 2008.

International Preliminary Report on Patentability (Form PCT/IB/373 and Form PCT/ISA/237) for International Application PCT/EP2007/007897, dated Mar. 17, 2009.

* cited by examiner

INTERNAL COMBUSTION ENGINE WITH MIXED CAMSHAFTS AND METHOD FOR OPERATING AN INTERNAL COMBUSTION ENGINE

CROSS-REFERENCE TO RELATED APPLICATIONS

This application is a continuation, under 35 U.S.C. §120, of copending International Application No. PCT/EP2007/007897, filed Sep. 11, 2007, which designated the United States; this application also claims the priority, under 35 U.S.C. §119, of German Patent Application No. DE 10 2006 042 912.5, filed Sep. 13, 2006; the prior applications are herewith incorporated by reference in their entirety.

BACKGROUND OF THE INVENTION

Field of the Invention

The invention relates to an internal combustion engine, operated according to the auto-ignition principle, in particular of a motor vehicle, having at least one working cylinder, with each working cylinder having at least two inlet valves and at least one outlet valve assigned thereto, wherein two camshafts are provided, of which at least one camshaft actuates both at least one inlet valve and also at least one outlet valve. The invention also relates to a method of operating an internal combustion engine operating in accordance with the auto-ignition principle.

In the known Miller/Atkinson cycle, the time "inlet valve closes" is shifted in the late direction. In this way, a portion of the fresh gas that is already in the cylinder is discharged again. This entails a charging disadvantage, which may however be compensated through the use of charging with a suitable charge pressure. In this case, the charge pressure in the volume between the charger outlet and the engine inlet should be regulated such that the charge pressure at every Miller operating point, that is to say every operating point at which the "Miller cycle" is used, corresponds to the theoretical compression end pressure in the working cylinders of the internal combustion engine at the time "inlet valve closes." Pressure and/or temperature and/or mass flow sensors or expedient sensor combinations of these three sensor types are used for a regulation or optionally also a control.

The positive effect of the Miller/Atkinson cycle on the $NO_x$ emissions, and on the capacity for homogenization of the diesel mixture, by using the early or late time for the closing of the inlet valve is known. Furthermore, in spark-ignition applications, the knocking tendency under high pressure charging can be considerably reduced. In contrast to the spark-ignition engine, which can operate with positive valve overlap on account of a lack of geometric constraints, a simple implementation of the method through the use of a phase adjuster is generally not possible in the case of a diesel engine. The reason for this is a mechanical collision of the valve with the piston in the event of an early adjustment, and increased pumping work in the event of a late adjustment.

From German Patent Application Publication No. DE 44 26 557 A1, it is known to arrange valves diagonally opposed in working cylinders of an internal combustion engine, such that two camshafts control in each case a part of the inlet valves. In this way, two separate inlet systems are created which, even though they have different control times, nevertheless have control times that are fixed.

German Patent Application Publication No. DE 103 59 058 A1 discloses a four-valve internal combustion engine having two inlet valves and two outlet valves and a total of three camshafts. According to one embodiment (see FIG. 1 of DE 103 59 058 A1), a first camshaft is assigned an inlet valve and an outlet valve, while a second camshaft actuates the second inlet valve and a third camshaft actuates the second outlet valve. The first and second camshaft are in each case assigned a phase adjuster. The described camshaft and valve configuration is intended for use in a gasoline internal combustion engine, though may also be used in an auto-ignition internal combustion engine. The displacements of the valve lift curves which are to be obtained through the use of the phase adjuster inevitably lead, in the case of an auto-ignition internal combustion engine, to a collision between the reciprocating piston and the valves. No answer is provided on how this problem would be eliminated with the proposed configuration. Furthermore, the proposed configuration is associated with a high level of component expenditure, since a total of three camshafts and two phase adjusters are necessary.

German patent document No. DE 195 81 571 T1, which is a translation of International Application Publication No. WO 95/24549 A1, and corresponding U.S. Pat. No. 5,682,854 disclose a four-valve diesel internal combustion engine as per FIG. 1, with a first camshaft actuating one of the inlet valves and both outlet valves, while a second camshaft can set in motion the other inlet valve and also one of the two outlet valves already actuated by the other camshaft. The second camshaft can, according to the description, be rotated by a defined angle by an adjusting device, such that the control of the inlet valve and outlet valve actuated by this camshaft is adjusted to a later time. In this configuration, the one outlet valve is actuated, with the interposition of rocker arms, by the two camshafts successively in terms of time, such that in the control diagram of this valve, a second opening takes place (FIG. 4, FIG. 6) while the inlet valves are actuated.

Furthermore, a four-valve spark-ignition internal combustion engine with mixed camshafts is known from German patent document No. DE 600 33 563 T2, which is a translation of International Application Publication No. WO 01/42627 A1, wherein each of the two camshafts actuates one inlet valve and one outlet valve per cylinder, with one of the camshafts being assigned a phase adjuster. The phase adjuster is utilized in the usual way to shift the associated control times of the respective inlet valve and outlet valve in relation to the control times of the fixed valves, cf. in particular FIG. 2b in that document. Such measures inevitably lead to a collision between the gas exchange valves and the reciprocating piston in the case of an auto-ignition internal combustion engine.

German patent document No. DE 601 19 993 T2, which is a translation of International Application Publication No. WO 02/29214 A1, and corresponding U.S. Pat. No. 7,146,949 B2, present a spark-ignition Otto-cycle internal combustion engine with four gas exchange valves, with one camshaft actuating both outlet valves and one of the inlet valves, wherein a further camshaft can actuate the second inlet valve. The second camshaft is assigned a phase adjuster.

SUMMARY OF THE INVENTION

It is accordingly an object of the invention to provide an internal combustion engine and a method for operating an internal combustion engine which overcome the above-mentioned disadvantages of the heretofore-known internal combustion engines of this general type and which improve an internal combustion engine with regard to the implementation of a Miller/Atkinson cycle.

With the foregoing and other objects in view there is provided, in accordance with the invention, an engine configuration, including:

an internal combustion engine operating in accordance with an auto-ignition principle;

the internal combustion engine having at least one working cylinder, at least two inlet valves per working cylinder and at least one outlet valve per working cylinder;

the internal combustion engine having a first camshaft and a second camshaft, the second camshaft actuating at least one of the at least two inlet valves per working cylinder and actuating at least one of the at least one outlet valve per working cylinder; and the internal combustion engine having an adjuster disposed at the second camshaft, the adjuster adjusting valve control times of the inlet and outlet valves actuated by the second camshaft selectively in an early direction and a late direction in relation to valve control times of the first camshaft.

In other words, according to the invention, there is provided an internal combustion engine, operated according to the auto-ignition principle, in particular of a motor vehicle, having at least one working cylinder, with each working cylinder being assigned at least two inlet valves and at least one outlet valve, with two camshafts being provided, of which one camshaft actuates both at least one inlet valve and also at least one outlet valve, wherein an adjuster is arranged at the one camshaft which actuates both at least one inlet valve and also at least one outlet valve, which adjuster selectively adjusts valve control times of the inlet and outlet valves assigned to this camshaft in the early (advance) or late (retard) direction in relation to the valve control times of the at least one other camshaft.

This has the advantage that, through the use of the combination of a phase adjuster with mixed camshafts, that is to say camshafts which simultaneously actuate both inlet valves and outlet valves, a Miller cycle can be implemented in a simple manner and even where there are geometric restrictions with regard to the lifting movement of the valves, such as for example in a diesel engine.

According to another feature of the invention, the adjuster is configured to have an adjustment range for valve control times of 60° CA+/−20°.

Another advantage is that improved exhaust gas can be obtained through the use of the combination of features according to the invention. It is thus possible, in a passenger motor vehicle which has an internal combustion engine according to the invention, to obtain nitrogen oxide emissions of less than 0.18 grams per kilometer traveled, in particular 0.1 g to 0.05 g. The emissions standards EU5 and EU6 legally stipulated for the European Union with regard to $NO_x$ emissions are therefore undershot. The standards prescribe a value of 0.18 g/km for the emission standard EU 5 and 0.08 g/km for the emission standard EU 6.

Furthermore, the particle emissions are reduced considerably in relation to conventional concepts, in such a way that it is possible to obtain values of below 0.005 grams per kilometer traveled, in particular from 0.004 g/km to 0.002 g/km.

According to another feature of the invention, two outlet valves are assigned to each working cylinder; the first camshaft actuates one half of the inlet and outlet valves; the second camshaft actuates another half of the inlet and outlet valves; and the first camshaft has fixed control times for the one half of the inlet and outlet valves actuated by the first camshaft. In other words, in a preferred embodiment, each working cylinder is assigned two outlet valves, with two camshafts being provided, with a first camshaft actuating one half of the inlet and outlet valves and a second camshaft actuating the other half of the inlet and outlet valves, with the first camshaft having fixed control times for the valves assigned to the camshaft and with the adjuster being arranged on the second camshaft.

A particularly large adjustment range can be obtained even in diesel engines without a collision between valves and reciprocating pistons if the second camshaft is configured such that, at an adjustment angle of 0° CA, the outlet valves assigned to the second camshaft close earlier than the outlet valves assigned to the first camshaft, and the inlet valves assigned to the second camshaft open later and close later than the inlet valves assigned to the first camshaft. In other words, two outlet valves are assigned to each working cylinder; the first camshaft has one half of the inlet and outlet valves assigned thereto; the second camshaft has another half of the inlet and outlet valves assigned thereto; the first camshaft has fixed control times for the one half of the inlet and outlet valves assigned to the first camshaft; the second camshaft is configured such that, at an adjustment angle of 0° CA, the outlet valves assigned to the second camshaft close earlier than the outlet valves assigned to the first camshaft; and the inlet valves assigned to the second camshaft open later and close later than the inlet valves assigned to the first camshaft.

Alternatively, the second camshaft is configured such that, at an adjustment angle of 0° CA, the inlet valves assigned to the second camshaft close at the same time as the inlet valves assigned to the first camshaft. In this case, only a late adjustment takes place. In other words, in an alternative embodiment, two outlet valves are assigned to each working cylinder; the first camshaft has one half of the inlet and outlet valves assigned thereto; the second camshaft has another half of the inlet and outlet valves assigned thereto; the first camshaft has fixed control times for the inlet and outlet valves assigned to the first camshaft; and the second camshaft is configured such that, at an adjustment angle of 0° CA, the inlet valves assigned to the second camshaft close simultaneously with the inlet valves assigned to the first camshaft.

With the objects of the invention in view there is also provided, a method for operating an internal combustion engine, which includes the following steps:

providing an internal combustion engine operating according to an auto-ignition principle, the internal combustion engine having at least one working cylinder, at least two inlet valves assigned to each working cylinder, at least one outlet valve assigned to each working cylinder, a first camshaft and a second camshaft;

actuating, with the second camshaft, at least one inlet valve and at least one outlet valve; and adjusting, with an adjuster assigned to the second camshaft, valve control times of the inlet and outlet valves assigned to the second camshaft selectively in an early direction and a late direction in relation to valve control times of the first camshaft.

In other words, according to the invention, there is provided a method for operating an internal combustion engine, operated according to the auto-ignition principle, in particular of a motor vehicle, having at least one working cylinder, with each working cylinder being assigned at least two inlet valves and at least one outlet valve, with two camshafts being provided, with it being possible for both at least one inlet valve and also at least one outlet valve to be actuated by at least one of the camshafts, wherein the one camshaft which actuates both at least one inlet valve and also at least one outlet valve is assigned an adjuster which selectively adjusts valve control times of the inlet and outlet valves assigned to this camshaft in the early or late direction in relation to the valve control times of the other camshaft.

Another mode of the method of the invention includes adjusting valve control times with the adjuster in such a way as to set, in an exhaust gas of the internal combustion engine, a value of a nitrogen oxide emission to less than 0.18 grams per kilometer traveled by a motor vehicle, preferably of less than 0.1 g/km, in particular 0.08 g/km.

Another mode of the method of the invention includes adjusting valve control times with the adjuster in such a way as to set, in an exhaust gas of the internal combustion engine, a value of a particle emission to less than 0.005 grams per kilometer traveled by a motor vehicle, preferably 0.004 g/km to 0.002 g/km.

Other features which are considered as characteristic for the invention are set forth in the appended claims.

Although the invention is illustrated and described herein as embodied in an internal combustion engine with mixed camshafts and a method for operating an internal combustion engine operated according to the auto-ignition principle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
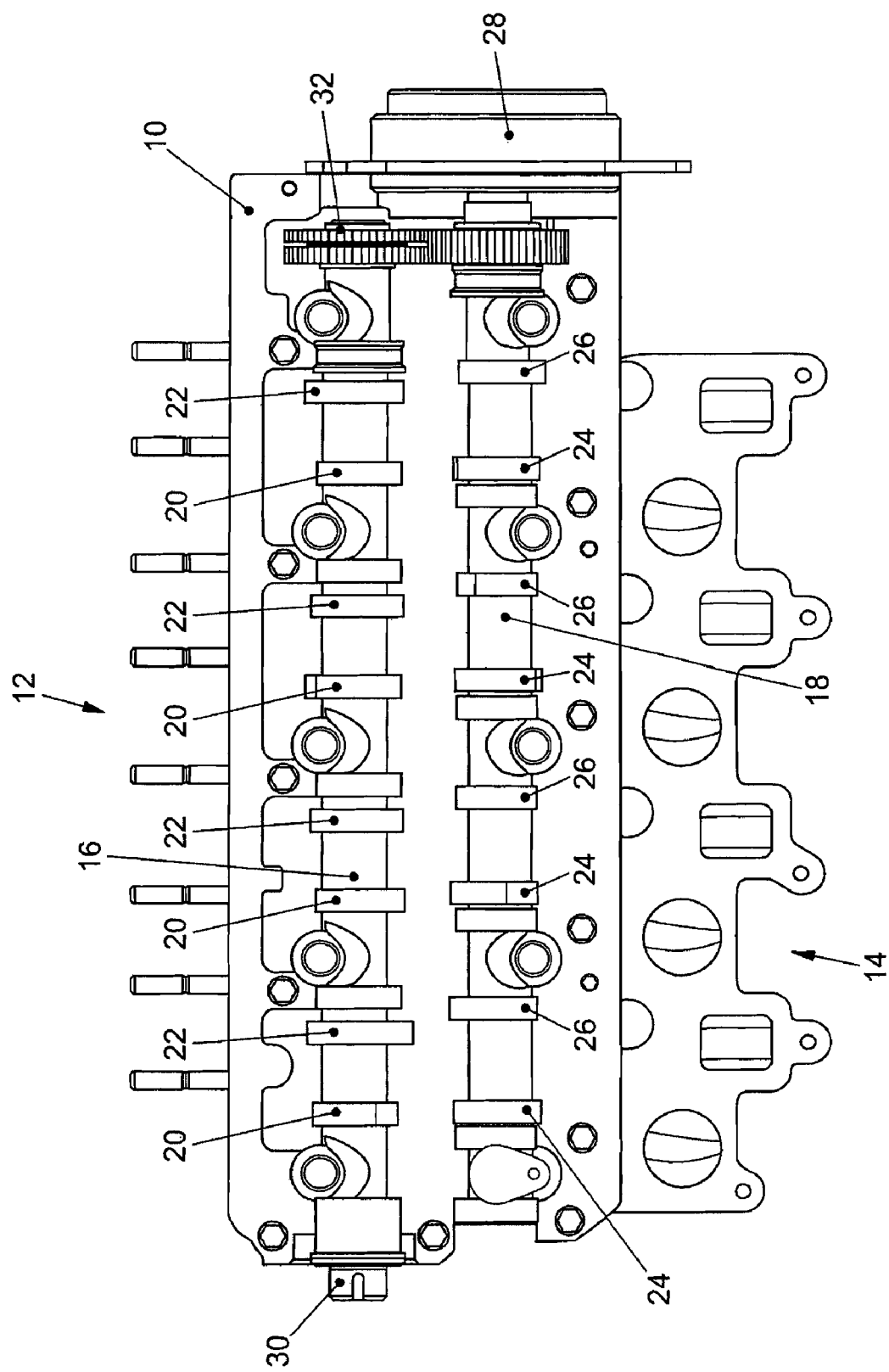
FIG. 1 is a diagrammatic plan view of a preferred embodiment of an internal combustion engine according to the invention.

Referring now to the figures of the drawings in detail and first, particularly, to FIG. 1 thereof, there is shown a preferred embodiment of an internal combustion engine according to the invention. The internal combustion engine includes a cylinder head 10 which delimits working cylinders in which in each case one reciprocating piston moves in an oscillating fashion. The cylinder head 10 has an outlet side 12 at which exhaust gases are discharged out of the working cylinders, and an inlet side 14 at which fresh gas is supplied to the working cylinders.

Figure 2:
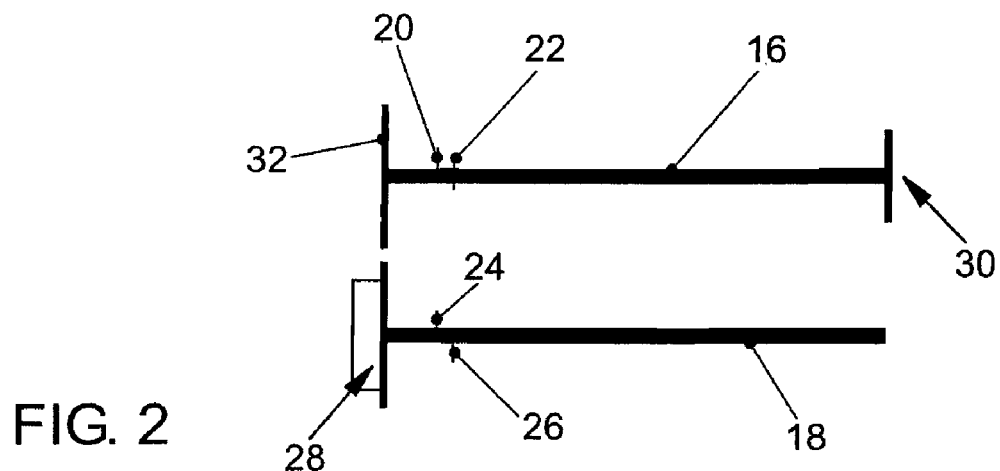
FIG. 2 is a schematic illustration of the camshaft configuration in the internal combustion engine of FIG. 1 in accordance with the invention.

Each working cylinder is assigned two inlet valves and two outlet valves, with a first camshaft 16 and a second camshaft 18 being provided. The first camshaft 16 supports inlet cams 20, which actuate in each case one inlet valve, and outlet cams 22, which actuate in each case one outlet valve. The second camshaft 18 likewise supports inlet cams 24, which actuate in each case one inlet valve, and outlet cams 26, which actuate in each case one outlet valve. On both camshafts 16, 18, inlet cams 20, 24 and outlet cams 22, 26 in each case are provided in an alternating fashion as viewed in the longitudinal direction. In this way, the two inlet valves and outlet valves of each working cylinder are actuated by different camshafts 16, 18. As can be seen in particular also from FIG. 2, each of the camshafts 16, 18 is therefore a so-called mixed camshaft, that is to say each camshaft 16, 18 actuates both inlet and also outlet valves through the use of corresponding inlet cams 20, 24 and outlet cams 22, 26.

Regardless of the number of gas exchange valves assigned to each working cylinder, all of the gas exchange valves are always actuated in their entirety by the two camshafts.

The control times of the first camshaft 16 for the inlet and outlet valves assigned thereto are unchangeably fixed. An adjuster 28 is disposed at the second camshaft 18, wherein the adjuster 28 varies the control times of the inlet and outlet valves assigned to the second camshaft 18 in relation to the control times of the first camshaft 16, by virtue of the second camshaft 18 being rotated relative to the first camshaft 16 by the adjuster 28. The first camshaft 16 is the camshaft which, at reference numeral 30, is driven by a crankshaft of the internal combustion engine. The first camshaft 16 then in turn drives the second camshaft 18 via gearwheels 32.

Figure 3:
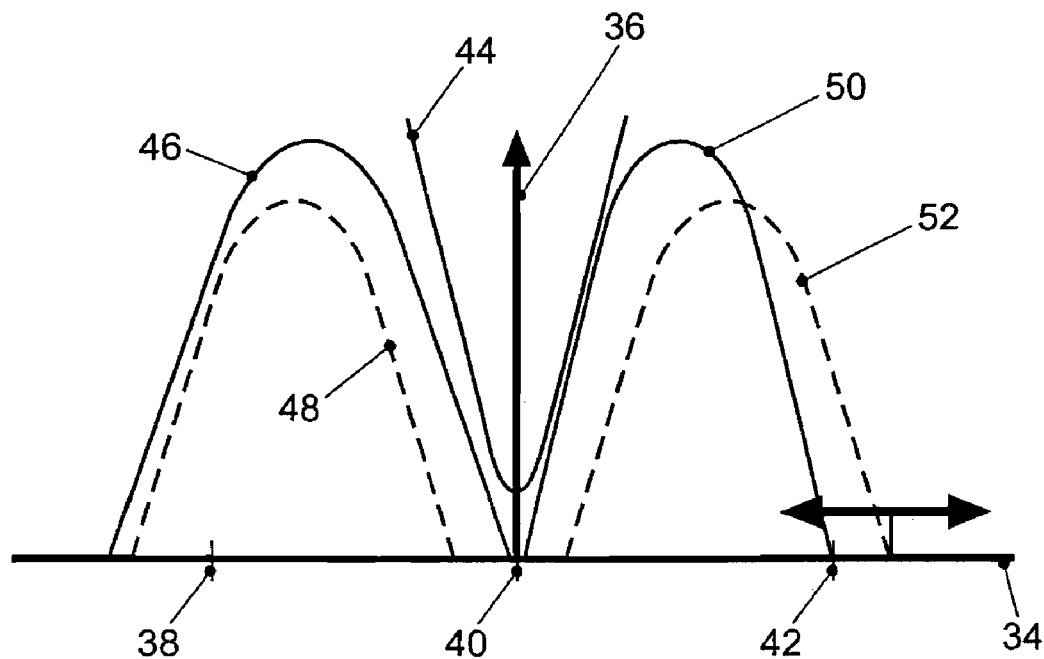
FIG. 3 is a graph illustrating the valve movement of the inlet and outlet valves of the different camshafts and the piston movement for an adjustment angle of 0° CA (Crank Angle) in accordance with the invention.
Figure 4:
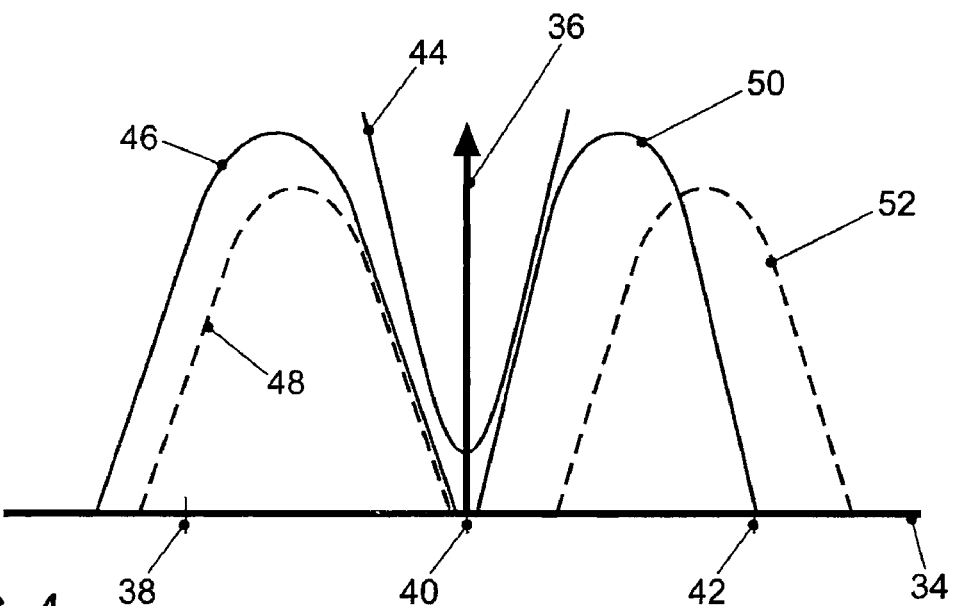
FIG. 4 is a graph illustrating the valve movement of the inlet and outlet valves of the different camshafts and the piston movement for the maximum adjustment in the early direction in accordance with the invention.
Figure 5:
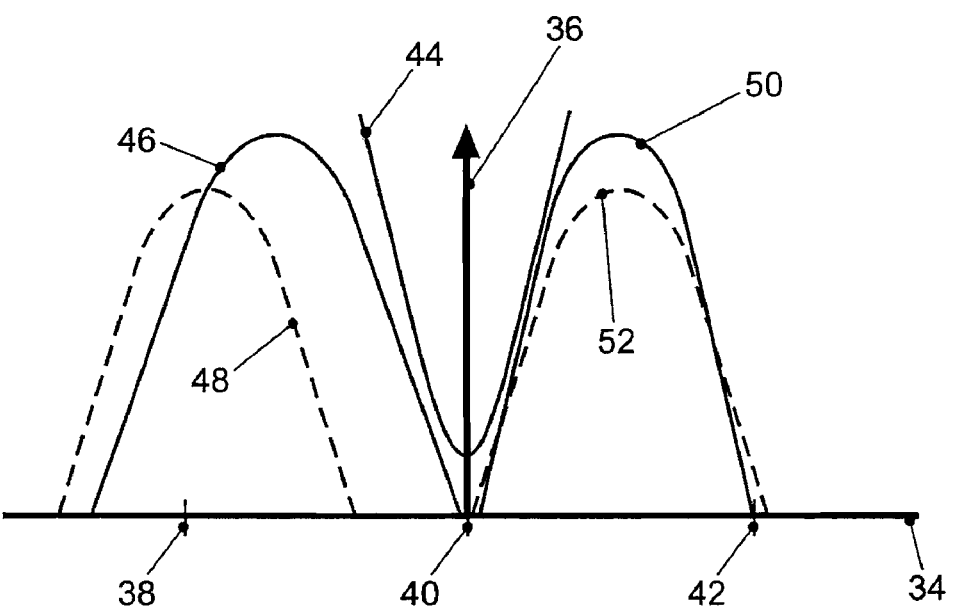
FIG. 5 is a graph illustrating the valve movement of inlet and outlet valves of the different camshafts and the piston movement for the maximum adjustment in the late direction in accordance with the invention.

In FIGS. 3 to 5, a crank angle is plotted on a horizontal axis 34 and a lifting movement is plotted on a vertical axis 36. On the horizontal axis 34, a bottom dead center (BDC) of the reciprocating piston before the charge exchange is plotted at 38, a top dead center (TDC) of the reciprocating piston during the charge exchange is plotted at 40, and a bottom dead center (BDC) of the reciprocating piston after the charge exchange is plotted at 42. A first graph 44 shows the lifting movement 36 against the crank angle 34 for the piston, a second graph 46 shows the lifting movement 36 against the crank angle 34 for those outlet valves which are controlled by the outlet cams 22 of the first camshaft 16, a third graph 48 (dashed lines) shows the lifting movement 36 against the crank angle 34 for those outlet valves which are controlled by the outlet cams 26 of the second camshaft 18, a fourth graph 50 shows the lifting movement 36 against the crank angle 34 for those inlet valves which are controlled by the inlet cams 20 of the first camshaft 16, and a fifth graph 52 (dashed lines) shows the lifting movement 36 against the crank angle 34 for those inlet valves which are controlled by the inlet cams 24 of the second camshaft 18.

FIG. 3 shows a position of the adjuster 28 for 0° CA (Crank Angle), that is to say the camshafts 16, 18 are not rotated relative to one another. FIG. 4 shows a position of the adjuster for a maximum adjustment in the late (retard) direction, and FIG. 5 shows a position of the adjuster for a maximum adjustment in the early (advance) direction. As can be clearly seen from FIGS. 2 to 5, the lifting movement of the valves of the first camshaft 16 (second graph 46 and fourth graph 50) relative to the crankshaft remains unchanged, whereas the lifting movement of the valves of the second camshaft 18 (third graph 48 and fifth graph 52, in each case dashed lines) for the associated inlet valves and outlet valves together have been shifted. In this way, it is possible firstly through the use of the shifted opening times between the inlet valves of the first camshaft 16 (inlet cams 20; fourth graph 50) and the inlet valves of the second camshaft 18 (inlet cams 24; fifth graph 52) to simulate a Miller effect (FIG. 3), wherein secondly, a collision between the inlet valves and the reciprocating piston is prevented.

A requirement for the simulated Miller cycle is the presence of at least two inlet valves per working cylinder and one, preferably two outlet valves per working cylinder, with the inlet valves of each working cylinder being actuated by different camshafts. Here, a camshaft 16 operates half of all the inlet and outlet valves with conventional control times. Alternatively, the inlet valves are optimized with regard to a maximum charge at a certain operating point, for example for the cold start operating point. The second camshaft 18 operates the remaining inlet and outlet valves and is configured with regard to the cam contour for "outlet valve closes" and "inlet valve opens" in such a way that an adjustment range of the camshaft 18 of approximately 60° CA+/−20° can be implemented without a piston collision.

The Miller effect is obtained in that the earliest "inlet valve opens" of the one camshaft 16 and the latest "inlet valve closes" of the other camshaft 18 are assigned to different valves for each working cylinder, cf. FIG. 4.

An increase in the compression end temperature is possible in that, at "inlet valve closes" of the fixed camshaft 16 (fifth graph 50) at BDC 42, the second camshaft 18 (Miller shaft) is likewise shifted in the early direction (fifth graph 52; cf. FIG. 5). At the same time, it is thus possible for an increase in the exhaust-gas temperature (important for exhaust-gas after treatment) to take place by shifting "outlet valve opens" of the Miller shaft 18 (third graph 48) in the early direction, as illustrated in FIG. 5. This can assist in a fast warm-up of an exhaust-gas catalytic converter after a cold start.

The first camshaft 16 has an "inlet valve closes" time at approximately BDC 42 in order to obtain the maximum compression ratio in the event of an early adjustment (advancing) of the second camshaft 18. Alternatively to the situation illustrated in FIG. 3 for 0° adjustment of the adjuster 28, this may also be considered as the 0° position for the second camshaft 18, such that then only a late adjustment takes place. It is however important in any case that the inlet cam of the first camshaft 16 is shortened in relation to the "inlet valve closes" time at approximately 10°-25° CA after BDC, which is common for example in diesel engines, in such a way that "inlet valve closes" can be attained at the BDC position by both cams.

What is claimed is:

1. An engine configuration, comprising:
   an internal combustion engine operating in accordance with an auto-ignition principle;
   said internal combustion engine having at least one working cylinder, at least two inlet valves per working cylinder and at least two outlet valves per working cylinder;
   said internal combustion engine having a first camshaft and a second camshaft, said first camshaft and said second camshaft each actuating at least a respective one of said at least two inlet valves per working cylinder and said first camshaft and said second camshaft each actuating at least a respective one of said at least two outlet valves per working cylinder;
   said internal combustion engine having an adjuster disposed at said second camshaft, said adjuster adjusting valve control times of said inlet and outlet valves actuated by said second camshaft selectively in an early direction and a late direction in relation to valve control times of said first camshaft; and
   said second camshaft being configured such that, at an adjustment angle of 0° CA, said respective one of said at least two outlet valves per working cylinder assigned to said second camshaft closes earlier than said respective one of said at least two outlet valves per working cylinder assigned to said first camshaft.

2. The engine configuration according to claim 1, wherein said adjuster is configured to have an adjustment range for valve control times of 60° CA+/−20°.

3. The engine configuration according to claim 1, wherein:
   two outlet valves are assigned to each working cylinder;
   said first camshaft actuates one half of said inlet and outlet valves;
   said second camshaft actuates another half of said inlet and outlet valves; and
   said first camshaft has fixed control times for said one half of said inlet and outlet valves actuated by said first camshaft.

4. The engine configuration according to claim 1, wherein:
   two outlet valves are assigned to each working cylinder;
   said first camshaft has one half of said inlet and outlet valves assigned thereto;
   said second camshaft has another half of said inlet and outlet valves assigned thereto;
   said first camshaft has fixed control times for said one half of said inlet and outlet valves assigned to said first camshaft; and
   said inlet valves assigned to said second camshaft open later and close later than said inlet valves assigned to said first camshaft.

5. The engine configuration according to claim 1, wherein:
   two outlet valves are assigned to each working cylinder;
   said first camshaft has one half of said inlet and outlet valves assigned thereto;
   said second camshaft has another half of said inlet and outlet valves assigned thereto;
   said first camshaft has fixed control times for said inlet and outlet valves assigned to said first camshaft; and
   said second camshaft is configured such that, at an adjustment angle of 0° CA, said inlet valves assigned to said second camshaft close simultaneously with said inlet valves assigned to said first camshaft.

6. The engine configuration according to claim 1, wherein said internal combustion engine is a motor vehicle engine.

7. A method for operating an internal combustion engine, the method which comprises:
   providing an internal combustion engine operating according to an auto-ignition principle, the internal combustion engine having at least one working cylinder, at least two inlet valves assigned to each working cylinder, at least two outlet valves assigned to each working cylinder, a first camshaft and a second camshaft;
   actuating, with the first camshaft, a respective one of the at least two inlet valves per working cylinder and a respective one of the at least two outlet valves per working cylinder;
   actuating, with the second camshaft, a respective one of the at least two inlet valves per working cylinder and a respective one of the at least two outlet valves per working cylinder; and
   adjusting, with an adjuster assigned to the second camshaft, valve control times of the inlet and outlet valves assigned to the second camshaft selectively in an early direction and a late direction in relation to valve control times of the first camshaft, wherein at an adjustment angle of 0° CA, the respective one of the at least two outlet valves per working cylinder assigned to the second camshaft closes earlier than the respective one of the at least two outlet valves per working cylinder assigned to the first camshaft.

8. The method according to claim 7, which comprises adjusting valve control times with the adjuster in such a way as to set, in an exhaust gas of the internal combustion engine, a value of a nitrogen oxide emission to less than 0.18 grams per kilometer travelled by a motor vehicle.

9. The method according to claim 7, which comprises adjusting valve control times with the adjuster in such a way as to set, in an exhaust gas of the internal combustion engine, a value of a nitrogen oxide emission to less than 0.1 grams per kilometer travelled by a motor vehicle.

10. The method according to claim 7, which comprises adjusting valve control times with the adjuster in such a way as to set, in an exhaust gas of the internal combustion engine, a value of a nitrogen oxide emission to less than 0.08 grams per kilometer travelled by a motor vehicle.

11. The method according to claim 7, which comprises adjusting valve control times with the adjuster in such a way as to set, in an exhaust gas of the internal combustion engine, a value of a particle emission to less than 0.005 grams per kilometer travelled by a motor vehicle.

12. The method according to claim 7, which comprises adjusting valve control times with the adjuster in such a way as to set, in an exhaust gas of the internal combustion engine, a value of a particle emission to between 0.004 and 0.002 grams per kilometer travelled by a motor vehicle.

13. The method according to claim 7, which comprises using the internal combustion engine as a motor vehicle engine.

* * * * *